Sept. 15, 1942.  R. A. SANDBERG  2,295,807
STEERING POST AND IGNITION LOCK ASSEMBLY
Filed Sept. 22, 1941  2 Sheets-Sheet 1
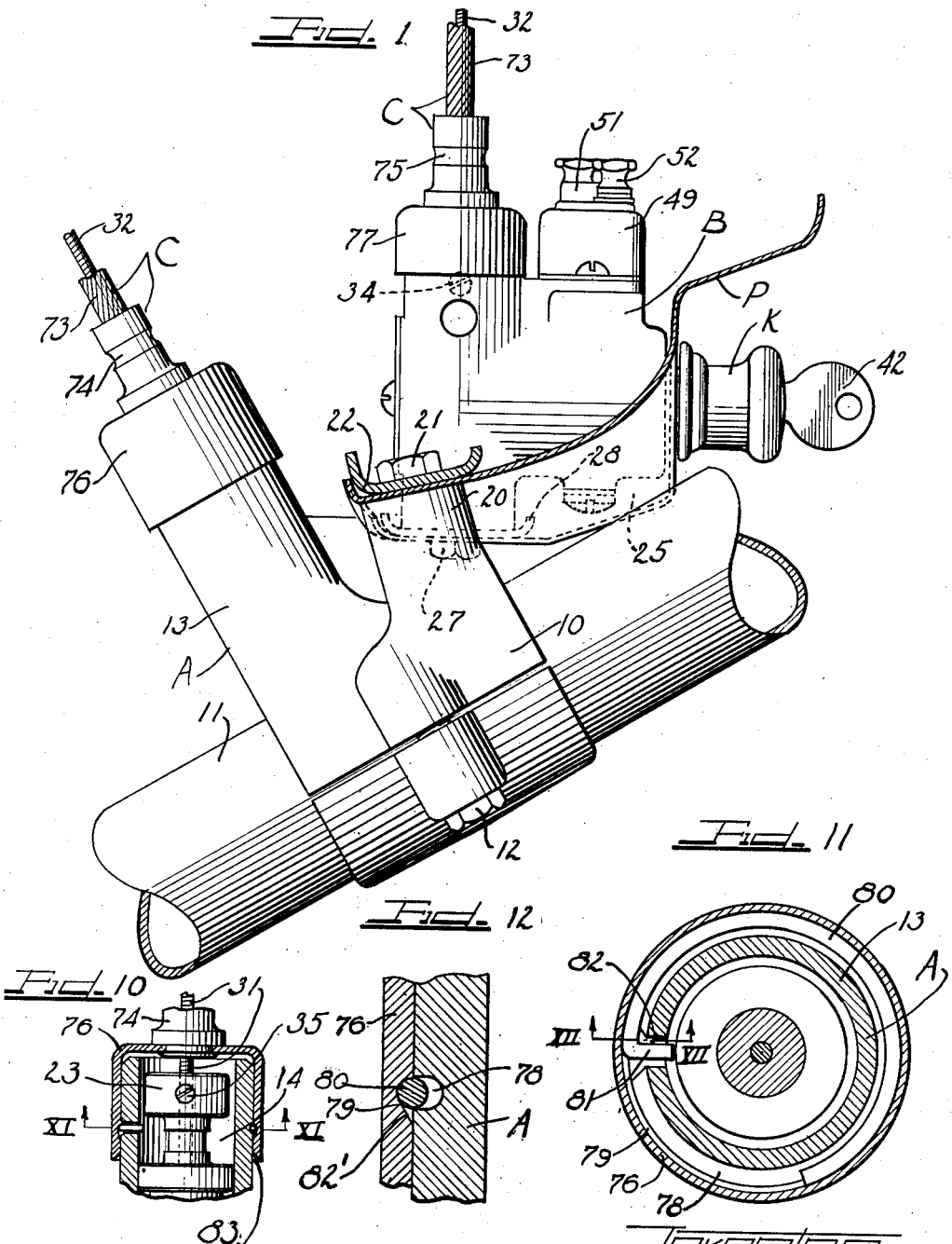
Inventor
RAY A. SANDBERG

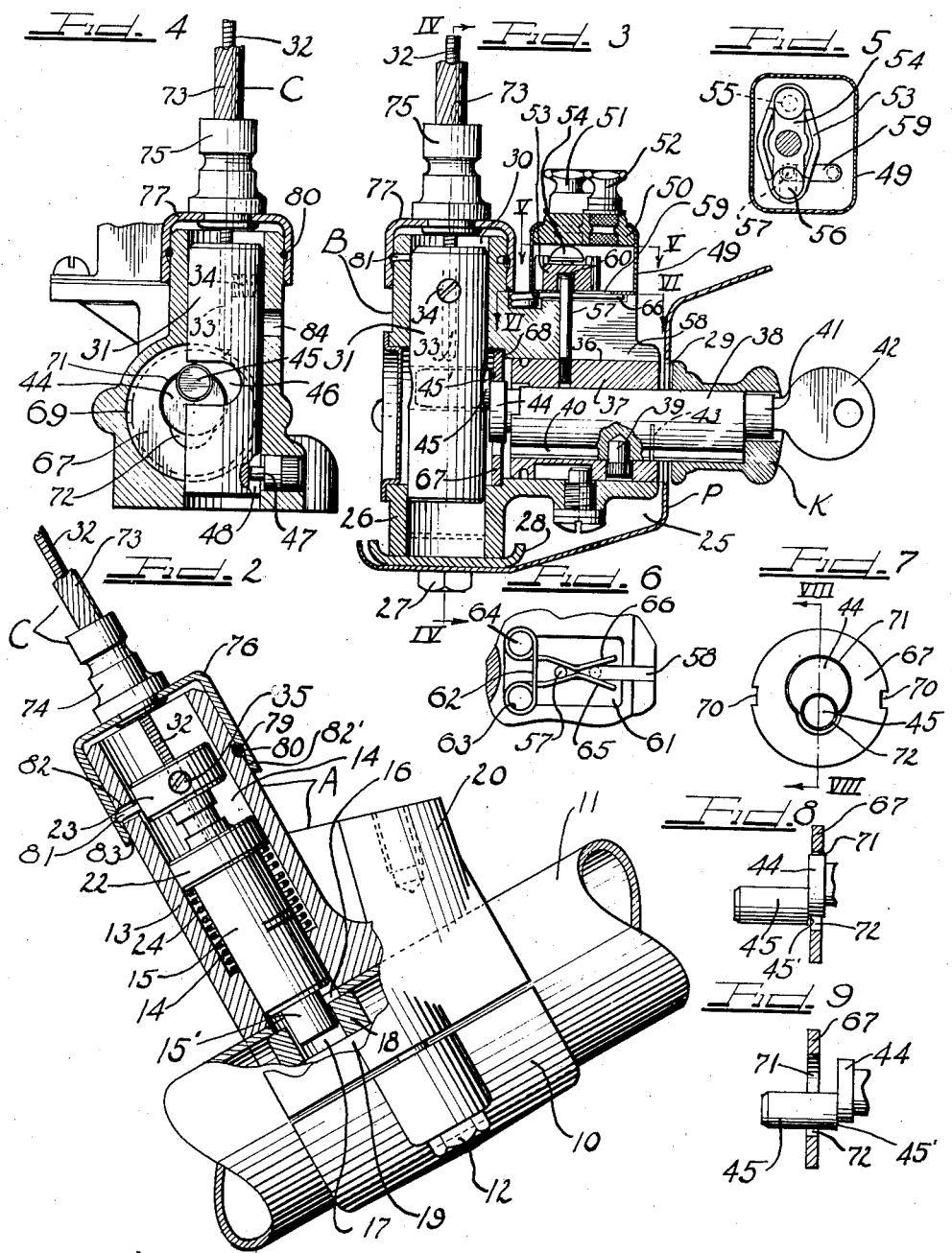

Patented Sept. 15, 1942

2,295,807

UNITED STATES PATENT OFFICE 2,295,807

STEERING POST AND IGNITION LOCK ASSEMBLY

Ray A. Sandberg, Waukegan, Ill., assignor to Houdaille-Hershey Corporation, Detroit, Mich., a corporation of Michigan Application September 22, 1941, Serial No. 411,793

8 Claims. (Cl. 70—252)

My invention relates to a locking assembly for locking the steering and ignition in an automobile vehicle and particularly to an arrangement in which a steering locking bolt is housed in a frame mounted on the steering column and a key-operable control for the steering locking bolt and an ignition switch are mounted on the instrument panel at a point remote from the steering column, as for example in the arrangement disclosed in my co-pending application Serial No. 361,091 filed October 14, 1940.

The steering column usually forms part of the chassis assembly and has the frame for the steering locking bolt secured thereto, while the instrument panel usually forms part of the body assembly and is provided with an opening through which the steering locking bolt control and the switch control are to project for manipulation from the front of the panel in the assembled vehicle. In a number of vehicles thus assembled there may be considerable variation in the distance between the steering column axis and the opening provided in the instrument panel for the controls and therefore the interconnection between the steering locking bolt in the frame on the steering column and the steering locking bolt control mounted in a frame on the panel must be adjustable for a considerable range of variation between the location of the steering locking bolt frame and the control frame so that the locking assembly may be used on different types of cars where the controls are to be mounted on the instrument panel remote from the steering column. In the arrangement of my co-pending application referred to, the interconnecting means between the steering locking bolt and the controls therefor on the instrument panel is housed in a frame structure comprising one frame containing the steering locking bolt and another frame on the instrument panel containing the controls, the two frames being adjustably connected together for adjustment to compensate for variations in the distance between the steering shaft axis and the control opening in the instrument panel. However, with such frame construction the compensation for variation of distance is limited only to the variations which might occur in different cars of the same type, and the arrangement could not be used in other types of cars where the distance between the column and the control on the instrument panel is different.

An important object of my invention is, therefore, to provide interconnection between the steering locking bolt on the steering column and the controls on the panel having a wide range of adjustment, and I preferably employ a flexible shaft or cable for such connection.

Another important object of the invention is to provide improved and simple means for disconnecting the flexible connection so that the steering locking bolt supporting frame may be secured to the steering column during assembly of the chassis and the frame for the controls may be secured on the panel when the body is assembled and then when the body is assembled on the chassis the flexible connection can be readily applied, and so that, when either of the frames is to be removed for repair or replacement, the flexible connection can be quickly detached.

A further object is to provide an arrangement in connection with the detachable flexible connection so that it cannot be detached or removed while the steering locking bolt is in locking position but can be detached only when the steering bolt is in its unlocking position.

Other important features of my invention involve improved interlock between the steering locking bolt control and the switch control so that the ignition switch cannot be closed until the steering locking bolt has been shifted by its control to unlocking position, and so that the steering locking bolt cannot be returned to locking position until the switch control has been moved to position for opening the ignition switch.

The various features of my invention are embodied in the structure shown on the drawings, on which drawings:

Figure 1 is a side elevation of the locking structure in service position;

Figure 2 is a side elevation of the frame on the steering column with the portion thereof housing the steering locking bolt in section and with part of the flexible shaft attachment with the frame shown in section;

Figure 3 is a vertical section through the frame structure on the instrument panel housing the steering locking bolt control and the switch and its control and showing the attachment of the flexible connection with the frame;

Figure 4 is a section on plane IV—IV of Figure 3;

Figure 5 is a section through the switch box on plane V—V of Figure 3;

Figure 6 is a section on plane VI—VI of Figure 3;

Figure 7 is an elevation view of the locking plate as shown in Figure 4, but showing the steering locking bolt control in steering unlocking position and for release of the switch control for switch operation;

Figure 8 is a section on plane VIII—VIII of Figure 7;

Figure 9 is a section like Figure 8 but showing the switch control in switch closing position and with the steering locking bolt control locked in steering opening position;

Figure 10 is a view like the upper end of Figure 2 with the steering bolt in unlocking position and for release of the flexible cable connection for detachment from the frame on the steering column;

Figure 11 is an enlarged section on plane XI—XI of Figure 10; and

Figure 12 is an enlarged section on plane XII—XII of Figure 11.

The assembly shown comprises the frame A mounted on the steering column, the frame B mounted on the instrument panel, and the flexible interconnection designated as a whole C.

The frame A comprises the split collar portion 10 receiving the steering column 11 to which it is securely clamped as by means of a screw or bolt 12, in a manner well understood in the art. The body 13 of the frame has the bore 14 for the steering locking bolt structure 15 whose end 15' is projectable through an opening 16 of the steering column for engagement in a recess 17 in a bushing 18 rigidly secured to the steering shaft 19 extending axially through the steering column and terminating at its upper end in the steering wheel (not shown). As shown, the frame A has an upwardly extending projection or lug 20 by means of which the frame may be secured to the instrument panel P as by means of a screw 21 and a washer 22, as shown on Figure 1.

The steering locking bolt 15 has inner and outer heads 22 and 23. The inner head 22 fits the bore 13 and assists in guiding the axial movements of the bolt to steering locking or unlocking position, a spring 24 between the head 22 and the bottom of the bore serving to shift the bolt to its unlocking position in case of breakage of the flexible connection C or its detachment from the frames A or B. The outer head 23 functions to prevent detachment of the connecting means C from the frame A when the steering locking bolt is in locking position in a manner as will be described more in detail later.

The bottom of the panel P is deflected downwardly to provide a recess or pocket 25 for the frame B, this pocket being a distance to the right of the connection of the frame A with the panel bottom. The base 26 of the frame B rests against the bottom of the pocket and is secured to the panel wall as by screws 27, with a cushioning washer 28 preferably inserted between the base and the panel. The frame body extends forwardly up to the front wall of the panel recess in alignment with the opening 29 in this front wall.

At its rear end the frame B has the bore 30 which is shown as extending vertically, in which bore a plunger 31 is axially shiftable. The plunger is connected with the steering locking bolt 15 by a flexible shaft, wire or cable 32 of the connecting means C. One end of the cable extends into a bore 33 in the plunger 31 to which it is secured by the set screw 34. At its other end the cable extends into a bore in the steering locking bolt 15 to be secured as by a set screw 35. In Figures 3 and 4 the plunger 31 is in its upper position and the steering locking bolt is in its locking position to prevent rotation of the steering shaft 19. Upon downward shift of the plunger, the resulting movement of the cable 32 will cause outward shift of the steering locking bolt 15 to steering unlocking position.

The frame B has a longitudinally extending bore 36 in which the switch control member, in the form of the sleeve 37, is axially shiftable, the bore 36 interconnecting the vertical bore 30 in which the plunger 31 is shiftable. Extending through the sleeve 37 is the tubular lock cylinder 38 which is secured to the sleeve 37 against both axial or rotary movement, the set screw 39 holding it against axial movement and the key 40 holding it against rotary movement in the sleeve. Rotatable in the lock cylinder 38 is the tumbler barrel 41 turnable by a key 42 detachably insertable in the outer end thereof. The tumbler barrel is locked against axial movement in the cylinder by a key 43. At its inner end the lock barrel 41 has a cylindrical head 44 coaxial therewith and from this head, at a point offset from the center thereof, a pin 45 extends with its axis parallel with but offset from the axis of the barrel. This pin 45 extends into a cross slot 46 in the plunger 31 so that, when the lock barrel 38 is turned by the key 42, the pin 45 will shift the plunger 31 in the bore 30. Figure 3 shows the plunger and the pin 45 in the upper position during which the steering locking bolt 15 is in steering locking position. Upon turning of the lock barrel by the key in clockwise direction (Figure 4) the pin will be swung through a circular path downwardly against the lower edge of the slot 46 for downward shift of the plunger in the bore 30 and pull on the cable 32 for outward shift of the steering locking bolt into unlocking position. The turning of the key for steering unlocking is 180°, and upon return of the key to its normal position the steering will be relocked. Turning movement of the plunger 31 in the bore 30 is prevented as by a pin 47 in the frame B engaging in the longitudinal channel 48 in the plunger (Figure 4).

Describing now the ignition switch structure, a switch box 49 is mounted on the frame B above the bore 36, the switch box cover 50 supporting terminals 51 and 52 which in service will be connected respectively with a source of current, such as a battery, and the ignition circuit. Within the switch box and seated against the bottom thereof is a switch block 53 having mounted on its top side a switch blade 54 having the contact beads 55 and 56 at its ends. The switch block is pivoted at one end adjacent to the contact bead 55 which bead is always in engagement with the battery terminal 51. As shown on Figures 3 and 5 the switch block is normally in position for disengagement of its contact 56 from the terminal 52. Upon swing of the block toward the left this contact will be brought into engagement with the terminal 52 for closure of the ignition circuit.

Extending upwardly from the axially shiftable sleeve 37 is a pin 57, this pin extending through a slot 58 in the frame B extending parallel with the sleeve 37. At its upper end the pin extends through the opening 59 in the bottom of the switch box and into a longitudinally extending recess 60 in the end of the switch block so that, when the sleeve 37 is shifted axially outwardly, the pin 57 will move therewith and swing the switch block 53 for spanning by its blade of the terminals 51 and 52 for closure of the ignition circuit. When the sleeve 37 is in its inner position with the switch open, it terminates at its front end behind the opening 29 in the instrument panel, and the lock cylinder 38 extends a distance outwardly beyond the end of the sleeve and has a knob K of suitable material secured thereto so that the lock cylinder together with the sleeve 37 may be shifted or pulled out or in for closure or opening of the ignition circuit, the sleeve 37 in its out position projecting a distance through the passageway 29 in the panel.

In order to hold this switch control assembly yieldably in its in or out position, a spring detent structure is seated in the recess 61 in the frame B below the bottom of the switch box. This detent structure is formed from a single piece of spring wire and comprises a yoke part 62 formed at its ends into spring coils 63 and 64 whose ends 65 and 66 extend laterally away from the yoke part 62 and are bent to V-shape, as shown on Figure 6, the spring coils 63 and 64 tending to hold these ends or legs together with their apices abutting. These spring legs receive between them the pin 57 extending to the switch block. When the sleeve 37 is in its in position, the pin 57 extends between the spring legs behind their contacting apexes and the sleeve will be yieldingly held in its in position by the spring engagement of the legs with the pin. When the sleeve 37 is moved out, the pin expands the spring legs apart until it comes into engagement between the legs in front of their apexes which then are sprung together, and the frictional engagement of the legs with the pin will then yieldingly hold the sleeve 37 in its out position. After passage of the pin 57 to either side of the apices of the spring legs, the pressure of the opposed inclined faces of the legs against the pin will tend to force the pin for movement of the sleeve 37 to either its in or out position in case the sleeve has not been fully manually shifted to such positions. Full closure and opening movement of the switch is thus assured, and at the same time the detent spring structure does not afford undue resistance to the manual in and out movement of the switch control structure.

Describing now the interlock between the steering lock bolt control and the switch control, an interlock plate 67 is provided. This plate is circular and seats against an annular shoulder 68 at the inner end of the bore 36 in which the sleeve 37 operates, abutment projections 69 on the shoulder engaging in slots 70 in the edge of the plate to hold the plate against rotary movement. The plate is located between the sleeve 37 and the inner end of the pin 45 and has the passageway 71 therethrough coaxial with the tumbler barrel 41 and of a radius equal substantially to the radius of the cylindrical head 44 so that this head may move into or out of the passageway as the sleeve 37 moves in or out. The passageway 71 at its lower end merges into the passageway 72 through the plate which may be circular but of less radius than the passageway 71 and with its center a distance below the center of the passageway 71, this passageway 72 receiving the pin 45 when the lock barrel 41 is turned for shift of the plunger 31 for unlocking of the steering bolt.

Referring to Figures 3 and 4, when the plunger 31 is in its upper position for locking of the steering, the pin 45, which is radially offset or eccentric relative to the head 44 of the lock barrel, presents an abutment shoulder 45' behind the plate 67 above the passageway 71 (Figs. 3 and 4). Thus when it is attempted to pull out the switch control for closure of the switch, this shoulder 45' will encounter the interlocking plate 67 to prevent such movement of the switch control. However, when the lock barrel 41 is turned by its key 42 to unlock the steering, the pin 45 will swing through 180° into position behind and in register with the passageway 72 in the plate, as shown on Figures 7 and 8, so that, while the steering is unlocked, the switch control may be pulled for switch closure, the lock barrel head 44 after such outward pull of the switch control being withdrawn from the plate passageway 71 and the pin 45 being drawn a distance into the lower passageway 72, as shown on Figure 9. Now, so long as the switch control is in its outer position and the ignition switch is closed, the lock barrel cannot be turned for locking of the steering by reason of the engagement of the pin 45 against the side edges of the passageway 72. The switch control must first be pushed in for switch opening and to bring the outer end of the pin behind the plate 67 before the lock barrel can be rotated for relocking of the steering, the pin then resuming its normal position with its shoulder behind the plate 67 above the passageway 71, as shown on Figures 3 and 4. Thus the switch control cannot be operated for switch closure while the steering is locked, and after switch closure by the switch control, the steering cannot be relocked until the switch control is shifted back for switch opening.

Referring to Figure 2, the spring 24 tends to shift the steering locking bolt to unlocking position. The spring is sufficiently light so as not to interfere with the shifting of the bolt to steering locking position by turning of the key 42, but is of sufficient strength to shift the lock bolt to steering unlocking position in case the cable 32 should break, or become disconnected. Under such conditions the steering will remain unlocked so that the car can be driven.

The flexible shaft or cable 32 is protected against cutting or unlawfully tampering by a flexible sheath 73 which is preferably formed of steel wires so as to be flexible and resistant. This armor sheath, through which the cable 32 shifts, has secured to its opposite ends the tubular fittings 74 and 75 respectively, the fitting 74 being rigidly secured to a cap 76 for receiving the end of the frame A, and the fitting 75 being rigidly secured to a cap 77 for the frame B.

The cap 76 receives the end of the frame A to close the outer end of the bore 14 and is detachably locked to the frame. As shown on Figures 2, 10, 11 and 12, the frame has the circumferential exterior groove 78 and the cap has the internal circumferential groove 79. A locking spring 80 is provided which, when the cap is in closing position on the frame A, expands to be part way in the groove 78 and part way in the groove 79 so as to lock the cap against removal from the frame. The spring 80 extends only about two-thirds of the circumferential extent of the groove, and at one end the spring is deflected to form the radial portion 81 projecting through a hole 82 in the frame A. The groove 79 is beveled at its inner side as indicated at 82' so that when pull is exerted on the cap this beveled surface will tend to cam the spring for radial contraction thereof out of the groove 79 so that the cap can be withdrawn. As shown on Figure 10, this can be accomplished only when the steering locking bolt 15 is in its unlocking position, because in this position the head 23 on the bolt is out of the path of the radial end 81 of the spring. When the bolt is in steering locking position as shown on Figure 2, this head 23 will be in the path of the spring end 81 and it will then be impossible to effect the contraction of the spring by outward pull on the cap and the cap cannot therefore be removed. After release of the cap, and pull thereof away from frame A, the steering locking bolt, which is secured to the cable 32, will be withdrawn from the bore 14 of the frame. The edge of the cap is beveled as indicated at 83, so that when the cap is reapplied this bevel will engage with and contract the spring 80 which then again snaps into the groove 79 to relock the cap in place. Such reapplication of the cap is done when the steering locking bolt is in its unlocking position with its head 23 away from the spring end 81 so that the spring will be free to be contracted.

A similar interlock may be provided for detachably securing the cap 77 to the frame B, with the spring locked against contraction by the plunger 31 when this plunger is in its upper position (Figure 3) for steering locking position of the locking bolt 15, and so the cap 77 can be removed only when the plunger 31 is shifted down for unlocking of the steering.

Before the cap 77 is detached from the frame B, the plunger 31 should be released from the cable 32. This is acomplished by loosening the set screw 34, but this can be done only when the plunger 31 is in its lower position with the steering locking bolt unlocked. Referring to Figure 4, a hole 84 is provided in the frame B for access by screwdriver or other tool with the set screw 34, but only when the plunger 31 is in its lower position and the set screw is brought into register with the hole 84. When the plunger is in its upper position corresponding to steering locking, the set screw is away from the hole 84 and covered by the wall of the frame surrounding the bore 30.

I have shown a practical and efficient embodiment of the features of my invention but I do not desire to be limited to the exact construction, arrangement, and operation shown and described, as changes and modifications may be made without departing from the scope of the invention.

I claim as my invention:

1. A locking assembly for an automobile comprising one frame mounted adjacent to the automobile steering shaft, said frame having a tubular part providing a bore, a locking bolt shiftable in said bore for locking or unlocking said shaft, a second frame mounted remote from said first frame, a plunger shiftable in said second frame, a flexible cable connecting said plunger with said bolt whereby shift of said plunger will cause movement of said bolt to locking or unlocking position, means on said second frame for controlling the shift of said plunger, a flexible protecting sheath for said cable attached at one to said second frame, a cap secured to the other end of said sheath for receiving the end of said tubular part on said first frame, circumferentially extending grooves in the outside of said tubular part and the inside of said cap respectively which grooves align when said cap is applied to said tubular part, a locking spring of less than 360° extent disposed in said grooves tending to lock said cap against removal, said tubular part having an opening, one end of said spring being deflected to extend through said opening into said bore, the inner side of the groove in said cap being beveled whereby outward pull on said cap will engage said bevel with said spring tending to contract it out of the groove in said cap for removal of the cap, and means on said locking bolt located in the path of the spring end when said bolt is in locking position whereby to prevent contraction of said spring upon pull of said cap and thereby preventing removal of the cap from said tubular part.

2. A locking assembly for an automobile comprising one frame mounted adjacent to the automobile steering shaft, said frame having a tubular part providing a bore, a locking bolt shiftable in said bore for locking or unlocking said shaft, a second frame mounted remote from said first frame, a plunger shiftable in said second frame, a flexible cable connecting said plunger with said bolt whereby shift of said plunger will cause movement of said bolt to locking or unlocking position, means on said second frame for controlling the shift of said plunger, a flexible protecting sheath for said cable attached at one end to said second frame, a cap secured to the other end of said sheath for receiving the end of said tubular part on said first frame, circumferentially extending grooves in the outside of said tubular part and the inside of said cap respectively which grooves align when said cap is applied to said tubular part, a locking spring extending circumferentially in said grooves normally expanded to lock said cap against removal, said tubular part having an opening, one end of said spring being deflected to extend through said opening into said bore, means on said cap effective on outward pull on said cap to engage with said spring to contract the spring to release the cap for detachment from said tubular part, and means movable with said locking bolt to be in the path of said spring end when the locking bolt is in locking position whereby to then prevent contraction of said spring by outward pull on said cap and thereby prevent removal of the cap.

3. A locking assembly for an automobile comprising one frame mounted adjacent to the automobile steering shaft, said frame having a tubular part providing a bore, a locking bolt shiftable in said bore for locking or unlocking said shaft, a second frame mounted remote from said first frame, a plunger shiftable in said second frame, a flexible cable connecting said plunger with said bolt whereby shift of said plunger will cause movement of said bolt to locking or unlocking position, means on said second frame for controlling the shift of said plunger, a flexible protecting sheath for said cable attached at one end to said second frame, a cap secured to the other end of said sheath for receiving the end of said tubular part on said first frame, circumferentially extending grooves in the outside of said tubular part and the inside of said cap respectively which grooves align when said cap is applied to said tubular part, a locking spring extending circumferentially in said opposed grooves and normally expanded to prevent removal of the cap, said cap having a beveled surface adapted upon outward pull on said cap to engage with and exert camming action against said spring for contracting said spring for release of the cap for removal from said tubular part, and cooperating means on said locking bolt and spring effective to prevent contraction of the spring upon outward pull on said cap when said locking bolt is in steering locking position.

4. A locking assembly for an automobile comprising a frame, a control member shiftable in said frame, a flexible cable extending from said control member through an open end of said frame, a protecting sheath for said cable, a cap secured at the end of said sheath for closing the open end of said frame, said frame having an external circumferential groove and said cap having an internal circumferential groove which grooves register when said cap is in closing position on said frame, a spring extending circumferentially in said grooves and normally extended for locking the cap to said frame, said cap having a beveled surface thereon engageable with said spring upon outward pull on said cap for effecting contraction of said spring for release of the cap on said frame, said cap having another beveled surface for engaging with said spring when said cap is reapplied to said frame for effecting contraction of said spring to permit application of the cap to the frame, and cooperating means on said spring and said control member effective to prevent contraction of said spring when said control member is in one of its positions.

5. A locking assembly for an automobile comprising one frame mounted adjacent to a structure to be controlled, said frame having a bore therethrough and a tubular end concentric therewith, a locking bolt shiftable in said bore for locking and unlocking the structure to be controlled, a second frame mounted remote from said first frame, an actuator in said second frame, a flexible cable connecting said actuator with said bolt whereby movement of said actuator will cause movement of said bolt to locking or unlocking position, means on said second frame for controlling the movement of said actuator, a flexible protecting sheath for said cable attached at one end to said second frame, a cap secured to the other end of said sheath for receiving the tubular end of said first frame, latch means on said first frame for latching said cap to the frame after application thereto, and means controlled by said locking bolt for preventing unlatching of said latching means when said locking bolt is in locking position.

6. A locking assembly for an automobile comprising one frame mounted adjacent to a structure to be controlled, said frame having a bore therethrough and a tubular end concentric therewith, a locking bolt shiftable in said bore for locking and unlocking the structure to be controlled, a second frame mounted remote from said first frame, an actuator in said second frame, a flexible cable connecting said actuator with said bolt whereby movement of said actuator will cause movement of said bolt to locking or unlocking position, means on said second frame for controlling the movement of said actuator, a flexible protecting sheath for said cable attached at one end to said second frame, a cap secured to the other end of said sheath for receiving the tubular end of said first frame, spring actuated latch means on said first frame and means on said cap for receiving said latch means when the cap is applied to said frame whereby said cap will be held to the frame, and means controlled by said locking bolt for locking said latch means against unlatching when said bolt is in locking position.

7. In an automobile control assembly, a frame, a control member shiftable in said frame, a flexible cable extending from said control member through an open end of said frame, a protecting sheath for said cable, a cap secured to the end of said sheath for closing the open end of said frame, latch mechanism on said frame engageable with said cap after application thereof to the frame, and means rendered effective by said control member when moved to one of its positions for preventing unlatching of said latching means and thereby the removal of said cap from said frame.

8. Control mechanism for an automobile comprising a first frame having a bore, a second frame having a bore, a control assembly comprising a plunger movable in the bore of the first frame and a plunger movable in the bore of the second frame and a flexible cable connecting said plungers for simultaneous movement, means on one of said frames for controlling the movement of said assembly, a flexible protecting sheath for said cable attached at one end to said first frame, a cap secured to the other end of said sheath for application to the second frame, latch mechanism on said second frame for latching said cap thereto after application thereof, and means effective upon movement of said assembly into one of its positions for preventing unlatching of said latch means.

RAY A. SANDBERG.